US012038895B1

(12) United States Patent
Usher et al.

(10) Patent No.: US 12,038,895 B1
(45) Date of Patent: *Jul. 16, 2024

(54) SYSTEMS AND METHODS FOR GEOSPATIAL CORRELATION

(71) Applicant: Black Cape Inc., Arlington, VA (US)

(72) Inventors: Abe Usher, Herndon, VA (US); Scott Fairgrieve, Clifton, VA (US); Scott Barnes, Leander, TX (US); Stephen Corbo, Washington, DC (US); Samuel Stowers, Gallatin Gateway, MT (US)

(73) Assignee: Black Cape Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,990

(22) Filed: Sep. 28, 2023

Related U.S. Application Data

(63) Continuation of application No. 18/328,711, filed on Jun. 2, 2023, now Pat. No. 11,797,508.

(51) Int. Cl.
  *G06F 16/22* (2019.01)
  *G06F 16/242* (2019.01)
  *G06F 16/2455* (2019.01)

(52) U.S. Cl.
  CPC ...... *G06F 16/2228* (2019.01); *G06F 16/2423* (2019.01); *G06F 16/2455* (2019.01)

(58) Field of Classification Search
  CPC ............. G06F 16/2228; G06F 16/2455; G06F 16/2423
  USPC ........................................................ 707/741
  See application file for complete search history.

(56) References Cited

U.S. PATENT DOCUMENTS

| | | | | |
|---|---|---|---|---|
| 7,168,025 B1* | 1/2007 | Berkovich | .......... | G06F 16/2255 714/759 |
| 7,698,325 B1* | 4/2010 | Ozekinci | ............. | G06F 16/2228 707/698 |
| 7,752,211 B1* | 7/2010 | Ozekinci | ............. | G06F 11/1451 707/778 |
| 7,979,441 B2* | 7/2011 | Sim-Tang | ........... | G06F 11/1469 707/741 |
| 8,725,705 B2* | 5/2014 | Hirsch | ................ | G06F 11/1464 707/698 |
| 8,935,487 B2* | 1/2015 | Sengupta | ............... | G06F 16/137 711/E12.002 |
| 8,965,901 B2* | 2/2015 | Merriman | ........... | G06F 16/2264 707/711 |

(Continued)

*Primary Examiner* — Hanh B Thai
(74) *Attorney, Agent, or Firm* — Scale LLP

(57) ABSTRACT

Disclosed are methods, systems and non-transitory computer readable memory for geospatial correlation. For instance, a method may include: obtaining a plurality of records, wherein each record has a key value that points to the record in a database, and each of the plurality of records includes at least data for an observation of an entity; and generating an index based on the plurality of records. The generating the index may include: determining a plurality of observations based on the plurality of records, an observation including a device identifier and time-and-geolocation data for a record of the plurality of records; encoding the plurality of observations into a plurality of spacetime hashes; and forming a search data structure of the index for a plurality of key values based on the plurality of spacetime hashes, wherein the search data structure groups subsets of the plurality of spacetime hashes.

20 Claims, 7 Drawing Sheets

(56) References Cited

U.S. PATENT DOCUMENTS

| | | | | |
|---|---|---|---|---|
| 9,300,471 B2* | 3/2016 | Araki | | G06F 16/322 |
| 9,646,036 B2* | 5/2017 | Merriman | | G06F 16/2264 |
| 10,572,465 B2* | 2/2020 | Merriman | | G06F 16/2255 |
| 11,249,999 B2* | 2/2022 | Colgrove | | G06F 16/2255 |
| 11,709,948 B1* | 7/2023 | Ghetti | | G06F 16/2255 |
| | | | | 713/193 |
| 2003/0074341 A1* | 4/2003 | Blackburn | | G06F 16/9014 |
| 2005/0166046 A1* | 7/2005 | Bellovin | | H04L 63/0428 |
| | | | | 713/165 |
| 2009/0228534 A1* | 9/2009 | Hirsch | | G06F 16/2455 |
| | | | | 711/216 |
| 2009/0271366 A1* | 10/2009 | Ellison | | G06F 16/9014 |
| 2011/0225168 A1* | 9/2011 | Burroughs | | H04L 45/7453 |
| | | | | 707/747 |
| 2012/0158729 A1* | 6/2012 | Mital | | H04L 47/78 |
| | | | | 707/738 |
| 2013/0031077 A1* | 1/2013 | Liu | | G06F 7/02 |
| | | | | 707/706 |
| 2013/0086004 A1* | 4/2013 | Chao | | G06F 21/55 |
| | | | | 707/E17.007 |
| 2013/0086017 A1* | 4/2013 | Chao | | G06F 16/90344 |
| | | | | 707/698 |
| 2013/0339319 A1* | 12/2013 | Woodward | | G06F 11/1461 |
| | | | | 707/692 |
| 2014/0052999 A1* | 2/2014 | Aissi | | G06F 21/64 |
| | | | | 713/189 |
| 2014/0108362 A1* | 4/2014 | Kim | | H03M 7/3084 |
| | | | | 707/693 |
| 2014/0129530 A1* | 5/2014 | Raufman | | G06F 16/901 |
| | | | | 707/693 |
| 2014/0164352 A1* | 6/2014 | Denninghoff | | G06F 3/04842 |
| | | | | 707/711 |
| 2015/0161122 A1* | 6/2015 | Merriman | | G06F 16/2255 |
| | | | | 707/747 |
| 2015/0169751 A1* | 6/2015 | Pennock | | G06F 16/9535 |
| | | | | 707/723 |
| 2015/0261884 A1* | 9/2015 | Pang | | H04N 19/30 |
| | | | | 707/741 |
| 2015/0278277 A1* | 10/2015 | Agrawal | | H04W 64/00 |
| | | | | 707/746 |
| 2015/0317211 A1* | 11/2015 | Barnes | | G06F 11/1451 |
| | | | | 707/646 |
| 2016/0063021 A1* | 3/2016 | Morgan | | G06F 16/182 |
| | | | | 707/754 |
| 2016/0171027 A1* | 6/2016 | Agrawal | | G06F 16/90344 |
| | | | | 707/743 |
| 2016/0188591 A1* | 6/2016 | Bestler | | H04L 63/0853 |
| | | | | 707/744 |
| 2018/0004744 A1* | 1/2018 | Guilford | | G06F 16/2255 |
| 2018/0137155 A1* | 5/2018 | Majumdar | | G06N 10/00 |
| 2018/0144152 A1* | 5/2018 | Greatwood | | H04L 63/123 |
| 2021/0182261 A1* | 6/2021 | Yeo | | G06F 21/602 |
| 2021/0224242 A1* | 7/2021 | Hardy-Francis | | G06F 16/2282 |
| 2022/0058198 A1* | 2/2022 | Dupont | | G06F 21/602 |
| 2022/0138182 A1* | 5/2022 | Yang | | G06F 16/245 |
| | | | | 707/703 |
| 2023/0069458 A1* | 3/2023 | Ulewicz | | G06F 21/6245 |

* cited by examiner

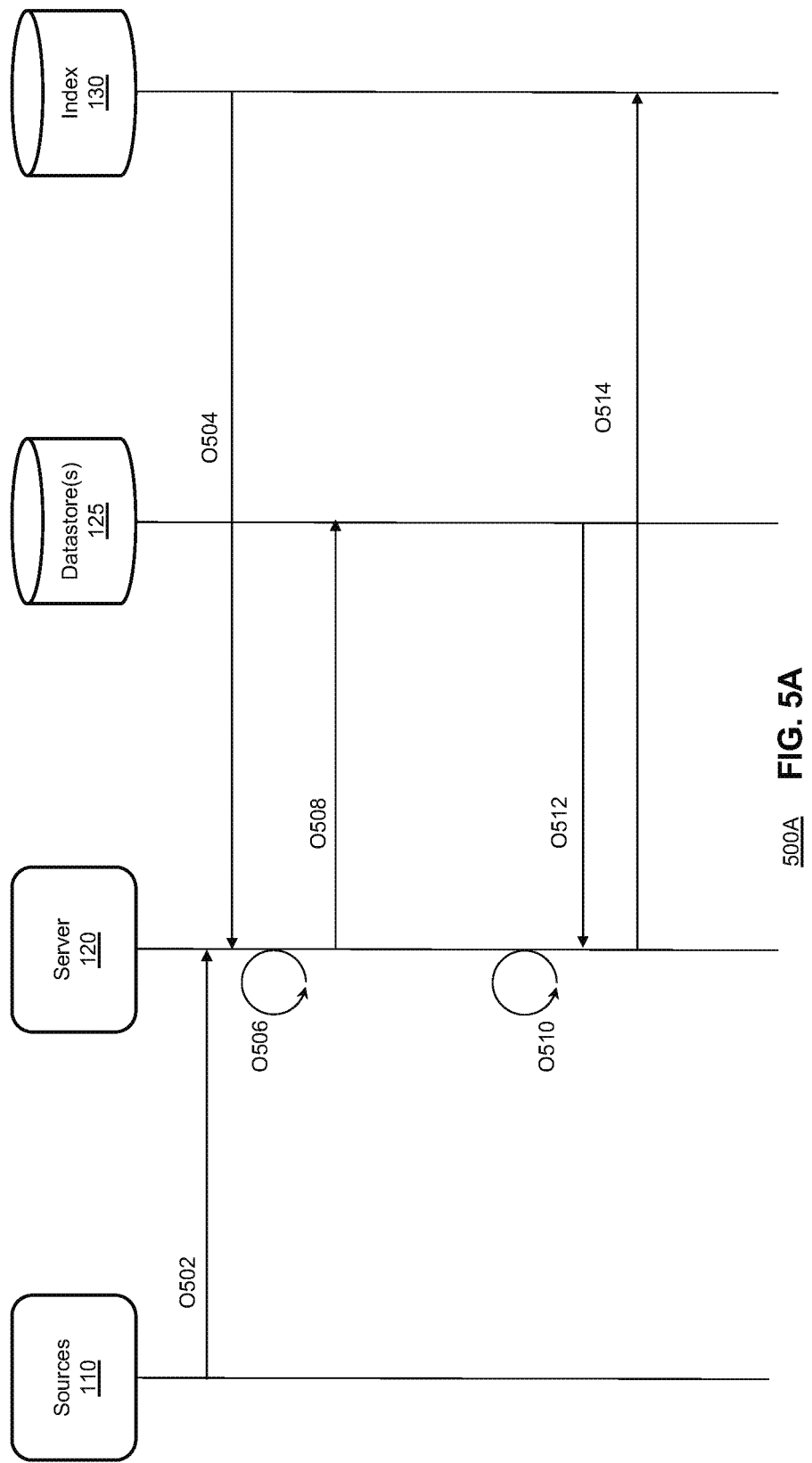

SYSTEMS AND METHODS FOR GEOSPATIAL CORRELATION

CROSS-REFERENCE TO RELATED APPLICATION(S)

This application is a continuation of U.S. application Ser. No. 18/328,711, filed Jun. 2, 2023, entitled "Systems and Methods for Geospatial Correlation." The entire contents of all of foregoing are incorporated herein by reference.

TECHNICAL FIELD

Various aspects of the present disclosure relate generally to systems and methods for geospatial correlation and, more particularly, to systems and methods for geospatial correlation using an index of spacetime hashes.

BACKGROUND

Generally, the amount of geospatial information available is increasing due to a number of macro-trends. For instance, ubiquitous low-cost sensors, smart-cities, and the like all report geospatial information. There is an increasing desire to automatically detect events of significance using spatial data, such as for entity tracking (e.g., packages, taxis, deliveries), national security, and the like. Additionally, governments and industry have a growing interest in fusing data across sources based on correlations and linkages in time and space. However, existing techniques based on clustering algorithms and spatial data search algorithms, are data intensive and relatively slow. Moreover, as a number of records to search through increases to billions or trillions, existing techniques based on clustering algorithms and spatial data search algorithms will get slower or more data intensive.

The present disclosure is directed to overcoming one or more of these above-referenced challenges.

SUMMARY OF THE DISCLOSURE

According to certain aspects of the disclosure, systems, methods, and computer readable memory are disclosed for geospatial correlation.

In some cases, a system for geospatial correlation may include: at least one processor; and at least one memory storing instruction that, when executed by the at least one processor, cause the at least one processor to perform operations. The operations may include: obtaining a plurality of records from at least one database, wherein each record of the plurality of records has a key value that points to the record in a database, and each of the plurality of records includes at least data for an observation of an entity; generating an index based on the plurality of records, wherein generating the index includes: determining a plurality of observations based on the plurality of records, an observation including a device identifier and time-and-geolocation data for a record of the plurality of records; encoding the plurality of observations into a plurality of spacetime hashes; forming a search data structure of the index for a plurality of key values based on the plurality of spacetime hashes, wherein the search data structure groups subsets of the plurality of spacetime hashes; after the index is generated: receiving a query message from a user device regarding an entity of interest; executing a search of the index based on the query message; and in response to the search of the index returning at least one matching key value, transmitting, to the user device, a query response based on the at least one matching key value.

In some cases, a system for geospatial correlation may include: at least one processor; and at least one memory storing instruction that, when executed by the at least one processor, cause the at least one processor to perform operations. The operations may include: receive a query message from a user device, the query message including a query in a defined format; parse the query and extract search parameters and at least one of a device ID or time-and-geolocation data of an entity of interest; obtain an encoded spacetime hash for a search based on the device ID or the time-and-geolocation data of the entity of interest; retrieve an index, wherein the index includes a search data structure for a plurality of key values, each of the plurality of key values point to at least one record of a plurality of records stored in at least one database, each of the plurality of records includes at least data for an observation of an entity, the search data structure is based on a plurality of spacetime hashes generated based on observations of entities, and the search data structure groups subsets of the plurality of spacetime hashes; execute a search of the index in accordance with the search parameters of the query and the spacetime hash; and in response to the search of the index returning at least one matching key value, transmit, to the user device, a query response based on the at least one matching key value.

In some cases, a computer-implemented method for geospatial correlation may include: obtaining a plurality of records from at least one database, wherein each record of the plurality of records has a key value that points to the record in a database, and each of the plurality of records includes at least data for an observation of an entity; generating an index based on the plurality of records, wherein generating the index includes: determining a plurality of observations based on the plurality of records, an observation including a device identifier and time-and-geolocation data for a record of the plurality of records; encoding the plurality of observations into a plurality of spacetime hashes; forming a search data structure of the index for a plurality of key values based on the plurality of spacetime hashes, wherein the search data structure groups subsets of the plurality of spacetime hashes; after the index is generated: receiving a query message from a user device regarding an entity of interest; executing a search of the index based on the query message; and in response to the search of the index returning at least one matching key value, transmitting, to the user device, a query response based on the at least one matching key value.

Additional objects and advantages of the disclosed technology will be set forth in part in the description that follows, and in part will be apparent from the description, or may be learned by practice of the disclosed technology.

It is to be understood that both the foregoing general description and the following detailed description are exemplary and explanatory only and are not restrictive of the disclosed technology, as claimed.

BRIEF DESCRIPTION OF THE DRAWINGS

The accompanying drawings, which are incorporated in and constitute a part of this specification, illustrate various exemplary aspects and together with the description, serve to explain the principles of the disclosed technology.

FIG. 5A depicts a block diagram schematically showing operations to generate/update an index.

DETAILED DESCRIPTION

Figure 1:
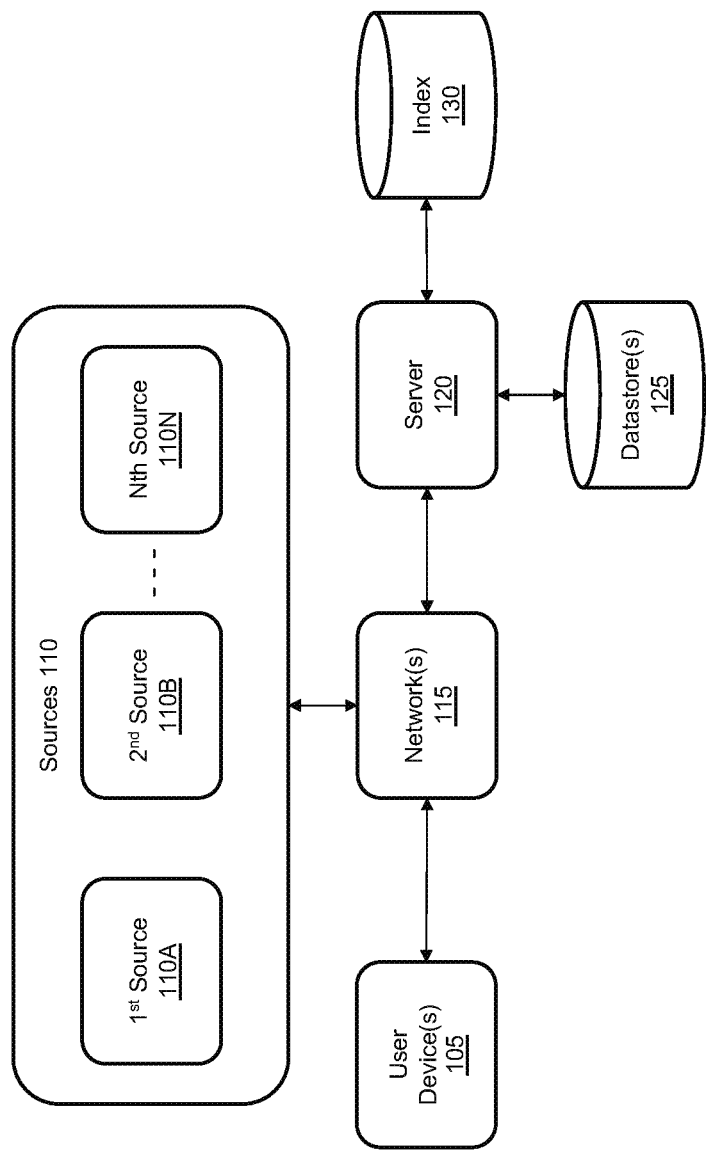
FIG. 1 depicts an example environment for geospatial correlation.

In general, the present disclosure is directed to methods and systems for geospatial correlation using an index of spacetime hashes. As discussed in detail herein, systems of the present disclosure may receive inbound observations/records and determine if any correlate to existing observations/records by searching an index. To search the index, the systems may encode the plurality of observations into a plurality of spacetime hashes and search the index for matching spacetime hashes. Spacetime hashes provide a fuzzy, scalable data format to perform same-time-and-place determinations between observations because spacetime hashes encode spatial-temporal data into a string of characters. In some cases, spacetime hashes may provide at least an order of magnitude search speed improvement as compared to clustering algorithms and spatial data search algorithms, especially as the number of observations/records increase to billions or trillions.

In some cases, the systems may form a search data structure of the index to search for matching spacetime hashes. In some cases, the search data structure is bitmap (of bit integers of spacetime hashes) or a trie. Generally, the search data structure groups spacetime hashes based on a sequence of characters for the spacetime hash.

For the trie, the trie groups spacetime hashes in nodes in accordance with the characters of the spacetime hash (so two observations/records that have the same spacetime hash would be grouped together). Moreover, the trie would store spacetime hashes that have a higher resolution (e.g., longer string) below a node that has a lower resolution (e.g., a shorter string), the higher resolution string would have the same leading characters as the shorter string, and the relationship would indicate that all of the spacetime hashes are within the same 4D spacetime region. In some cases, the trie may provide multiple orders of magnitude search speed improvement as compared to clustering algorithms and spatial data search algorithms, especially as the number of observations/records increase to billions or trillions.

For the bitmap, the bitmap may group bit integers (encoded spacetime strings) in at least one group. In the case of a roaring bitmap, the systems may group bit integers in containers that share the same most significant bits. In some cases, the system may store the bit integers in the containers based on how sparse or dense the container is filled. In some cases, the roaring bitmap may provide multiple orders of magnitude search speed improvement as compared to clustering algorithms and spatial data search algorithms, especially as the number of observations/records increase to billions or trillions.

After the index is generated, the systems may process query messages to return query responses. The query messages request a determination of whether a device or observation is (or set of devices/observations are) correlated with any existing observations/records. The system may search the trie or bitmap to determine spatial-temporal correlations by matching on nodes (for the trie) or bit integers (for the bitmap). In certain circumstances, the system may also determine additional correlations, such as based on device IDs or metadata analysis to provide higher confidence results, albeit at a slower response time for the query messages.

Thus, methods and systems of the present disclosure may be improvements to computer technology and/or geospatial correlation.

Environment

FIG. 1 depicts an example environment 100 for geospatial correlation. The environment 100 may include user device(s) 105, sources 110, network(s) 115, a server 120, datastore(s) 125, and an index 130. The server 120 may (1) receive, coordinate, and manage records from the sources 110 in the datastore(s) 125, and (2) perform queries (e.g., from user device(s) 105) to return data about or from records stored in the datastore(s) 125. In some cases, the server 120 may search the index 130 to return results faster. Generally, the index 130 includes a search data structure that is generated based on spacetime hashes associated with records in the datastore(s) 125. In some cases, the server 120 may search the index 130 and/or the datastore(s) 125 to return results at different levels of retrieval speed and/or confidence level.

The user device(s) 105 (hereinafter "user device 105" for ease of reference) may be a personal computing device, such as a cell phone, a tablet, a laptop, or a desktop computer. In some cases, the user device 105 may be an extended reality (XR) device, such as a virtual reality device, an argument reality device, a mixed reality device, and the like. In some cases, the user device 105 may be associated with a user (e.g., an end user) of services provided by the server 120 (e.g., entity tracking, co-traveler tracking, and the like). The user may have a user account associated with the user device 104/server 120 that uniquely identifies the user.

The sources 110 may obtain observations from observation devices (or from datastore(s) associated with observation devices), and the sources 110 may provide the observations to the server 120 as records. The sources 110 may include a plurality of sources, such as a first source 110A, a second source 110B, . . . and an nth source 110N. Each of the sources 110 may be associated with a set of observation devices. Each set of observation devices may be unique to a source, or different sources 110 may having sets of observation devices that share common observation devices. The sources 110 may report observations of the same or different entities, based on the modality of the observation devices, the range of observations devise, or region of focus of observation devices. Observation devices may be any type of device that determines geospatial data (and time data) as an entity exists in or moves through an environment. In some cases, the observation devices may be a part of the entity (e.g., a GPS system incorporated into a vehicle or cell phone). In some cases, the observation devices may sense, track, and determine geospatial data for the entity (e.g., imaging, electromagnetic communications (e.g., between a cell tower and a cellular modem, a WIFI router and WIFI modem, and the like), electromagnetic radiation (e.g., radar/lidar), sonar, and the like).

The network(s) 115 may include one or more local networks, private networks, enterprise networks, public networks (such as the internet), cellular networks, and satellite networks, to connect the various devices in the environment 100. Generally, the various devices of the environment 100 may communicate over network(s) 115 using, e.g., network communication standards that connect endpoints corresponding to the various devices of the environment 100.

The server 120 may be a personal computer device, a server, a system of servers, a set of compute instances in the cloud (e.g., provided by a cloud service provider), and the like. The server 120 may, as discussed herein, (1) receive, coordinate, and manage records from the sources 110 in the datastore(s) 125, and (2) perform queries (e.g., from user device(s) 105) to return data about or from records stored in the datastore(s) 125.

In certain aspects, the server 120 may host and execute a records management application. In some cases, the records management application may receive inbound records from sources 110; determine correlations of inbound records, if any, with existing records of the datastore(s) 125; and store the inbound records (e.g., as new records or fused records). In some cases, the records management application may update (or replace) a search data structure of the index 130 based on the inbound records being stored.

In certain aspects, the server 120 may host and execute a query application (e.g., an API application and/or a server-side application corresponding to a browser program, a mobile application, a desktop application, and the like on the user device 105) so that query messages may be received, processed, stored, and responded to with query responses. The server 120 may store relevant data (e.g., a search data structure) locally, such as in a cache, to determine query responses. In some cases, the server 120 may provide graphical user interfaces, so that end users using user devices 105 may generate query messages and view query responses. In some cases, the server 120 may host API endpoints of the API application to process query responses from user devices 105 and provide query responses to the user devices 105, which may process and use data of the query responses to display data of the query response, update values associated with entities of the query response, or determine actions, statuses, and like.

The datastore(s) 125 may be a structured or unstructured database or other data storage system (e.g., time series database, a data lake, etc.). The datastore(s) 125 may store records regarding entities. In response to instructions from the server 120, the datastore(s) 125 may add new records, update records (e.g., fuse data or two or more records), delete records, or move records. The datastore(s) 125 may store records (in various tables or data structures), in different secure methodologies based on sensitivity, etc. In some cases, the datastore(s) 125 may include at least a record datastore. In some cases, the datastore(s) 125 may also include an ID datastore and a metadata datastore for multi-tiered searches, to support tiered query functionality (e.g., fast response versus higher confidence, or based on incomplete data) of the server 120.

The index 130 may be a data structure that stores at least one search data structure, discussed below with respect to FIGS. 4 and 5. While the index 130 is depicted separate from the server 120, the index 130 may be a part of the server 120 or hosted separately on a dedicated server (or cloud compute instance). In some cases, the index 130 may store and manage different types and/or versions of search data structures.

In some cases, the server 120 may start with a plurality of records, and without a search data structure in the index 130. In this case, the server 120 may generate an index from the existing plurality of records (e.g., from the datastore(s) 125). In some cases, the server 120 may receive records (e.g., in real-time or in batches from sources 110) and update an existing search data structure of the index 130 or generate a new search data structure for the index 130 (to replace the existing search data structure). In some cases, the server 120 may use the older version of the search data structure while the update/generation of a new search data structure is performed.

In some cases, the server 120 may obtain a plurality of records from the datastore(s) 125, to generate (for the first time) or update/generate a new search data structure. In some cases, each record of the plurality of records has a key value that points to the record in a database/data store of the datastore(s) 125. In some cases, each of the plurality of records includes at least data for at least one observation of an entity. In some cases, the key value is unique (e.g., the key value indicates a specific record in a datastore). In some cases, the key value is an entity ID (e.g., a person ID, a device ID, and the like) and the key value is not unique (e.g., the key values points to all records associated with the entity ID in the datastore). In some cases, each observation of has a spacetime hash stored in association with it. As a non-limiting example, Table 1 of Records below of a datastore 125 may store observation data, including key value(s), spacetime hashes, spatial-temporal data (e.g., latitude, longitude, altitude, and time), and metadata of the observation.

TABLE 1

Example Records

| Key Value | Spacetime Hash | Spatial-Temporal Data | Metadata #1 | ... | Metadata #2 |
|---|---|---|---|---|---|
| 000001 | aa3b4fcde13defgabc | Lat1, long1, Atl1, t1 | Source 1 | ... | Latency 1 |
| ... | ... | ... | ... | ... | ... |
| 100001 | aa3b4fcde13defffff | LatN, LongN, AtlN, tN | Source N | ... | Latency N |

To generate the index based on the plurality of records, the server 120 may determine a plurality of observations based on the plurality of records. For instance, the server 120 may merge duplicate observations from two or more existing records (if this is the first time generating the index) and/or merge duplicate observations of inbound records (if this is an update cycle). In some cases, an observation, for index generation purposes, includes at least a key value (e.g., entity ID or device ID) and time-and-geolocation data (e.g., geospatial data, altitude data, and time data from an observation device) for a record of the plurality of records.

The server 120 may encode the plurality of observations into a plurality of spacetime hashes. For instance, the server 120 may encode the time-and-geolocation data (e.g., into a spacetime hash), as discussed herein. In some cases, the server 120 may encode the observations and store the spacetime hashes in the datastore 125 (if the index has not been generated before) or the server 120 may encode the observations during inbound record ingest (if this is an update cycle), and any new or fused record will store the spacetime hash.

To generate the index, the server 120 may form a search data structure of the index for a plurality of key values based on the plurality of spacetime hashes. Generally, as discussed herein, the search data structure groups subsets of the plurality of spacetime hashes into different groups. See, e.g., FIGS. 4 and 5.

After the index is generated (for the first time) or after it is updated or re-generated (in an update cycle), the server 120 may process query messages using the index (or updated/re-generated index). For instance, the server 120 may receive a query message from a user device 105 regarding an entity of interest, and execute a search of the index based on the query message. In response to the search of the index returning at least one matching key value, the server 120 may transmit to the user device 105 a query response based on the at least one matching key value. Generally, the query message may include a query in a defined format (e.g., in accordance with an API design or based on user inputs via a graphical user interface). Additionally, the query response may include at least a Boolean value (e.g., true for search returned a match), or the matching key value. In some cases, the query response may include additional data, such as (some or all) records associated with the matching key value.

In some cases, to execute a search of the index based on the query message, the server 120 may parse a query of the query message and extract search parameters and at least one of (1) a device ID (or key value/entity ID) or (2) time-and-geolocation data of an entity of interest. In some cases, the query may include only a device ID of the entity or include only time-and-geolocation data of the entity. In some cases, the query message may include a set of time-and-geolocation data (e.g., for several observations, for several entities). In some cases, the query message may include a set of device IDs.

Next, the server 120 may obtain an encoded spacetime hash for a search based on the device ID or the time-and-geolocation data of the entity of interest. Likewise, in the case of a set of device IDs or a set of time-and-geolocation data, the server 120 may obtain corresponding sets of encoded spacetime hashes. In the case of time-and-geolocation data, the server 120 may encode the relevant data into a spacetime hash. In the case of device IDs, the server 120 may search the datastore(s) 125 for records that match the device IDs, retrieve corresponding time-and-geolocation data, and encode the retrieved time-and-geolocation data.

Next, the server 120 may execute a search of the index in accordance with the search parameters of the query and the spacetime hash. Likewise, in the case of a set of device IDs or a set of time-and-geolocation data, the server 120 may search of the index in accordance with the search parameters of the query and the sets of encoded spacetime hashes.

In some cases, the search parameters may include one or combinations of: a variable precision indicator, and/or a relaxation parameter. The variable precision indicator (if included in the query message) indicates to the server 120 to use a search data structure configured to handle variable precision searching (e.g., a trie). In this case, the server 120 may, if no key values are returned on a first pass (e.g., no node matches a spacetime hash string at lowest level of resolution), iteratively (for a number of iterations) remove a trailing character from the spacetime hash string and re-search the trie until a key value is returned (e.g., a node matches the modified spacetime hash) or the set of iterations has ended (e.g., no match is found). The relation parameter may be user-defined or set by a user's organization (e.g., based on context), and the relation parameter may set the number of iterations that the trailing character is removed from the spacetime hash string (thus, changing geohash scale, altitude hash scale, and/or time hash scale (or all three at once)).

In some cases, the query response may include the at least one matching key value and/or data retrieved from the datastore(s) 125 based on the at least one matching key value. In some cases, the query response indicates a correlation between the entity of interest and entity(s) associated with the at least one matching key value. In this case, the entity(s) associated with the matching key value may be determined to be co-travelers of the entity of interest or are determined to be the entity of interest. For instance, the server 120 may perform an analysis of device IDs and/or metadata of the observations to distinguish or confirm the entities of both records as separate (e.g., co-travelers) or the same entity (e.g., duplicate observations).

To perform the analysis of device IDs, the server 120 may determine an identifier (e.g., device ID) of the entity of interest (e.g., based on metadata in the inbound record from sources), retrieve identify(s) (from the datastore(s) 125) associated with the at least one matching key value, and determine whether the identifier matches identify(s) associated with the at least one matching key value. In this manner, spacetime hashes may accurately and quickly determine two observations for entities at a same region and time (at the relevant resolution of the hierarchical of the spacetime hash), and the confirm whether the entities are the same or not (e.g., based on device ID or metadata).

To perform the analysis of the metadata, the server 120 may determine metadata of the entity of interest correlates to metadata associated with the at least one matching key value. For instance, the server 120 may retrieve metadata of the entity of interest (e.g., based on metadata in the inbound record from sources), retrieve sets of metadata (from the datastore(s) 125) associated with the at least one matching key value, and determine whether the metadata correlates to one or more metadata sets associated with the at least one matching key value. Generally, correlating metadata sets may determine two sets of metadata match if correlation conditions are satisfied. Correlation conditions may be if specific portions of metadata match, if a threshold number of metadata portions match, if entity distinguishing features of metadata match, and the like.

In the case that the entity of interest is determined to be the same as the entity of the matching key value, the server 120 may fuse observation data of the at least one matching key value and observation data associated with the entity of interest (e.g., no new record is formed and the existing record is updated with the inbound record, as this is a duplicate observation). In the case that the entity of interest is not determined to be the same as an entity of the matching key value, the server 120 may (1) generate and store a new record for observation data associated with the entity of interest (e.g., so the entity of interest is recorded at this spacetime hash in a record), and/or (2) fuse at least some data of observation data associated with the entity of interest to observation data of the at least one matching key value (e.g., to add context to the existing record).

In some cases, the search data structure is a trie or a bitmap. See FIGS. 3 and 4. In some cases, the server 120 may select one of the trie or the bitmap to use for a search. In some cases, the server 120 may select a version of the trie or bitmap (e.g., based on time window/region of search). In some cases, when the query message requests variable precision in the query parameters of the query message, the server 120 may select the trie for the search of the index. In some cases, when the query message requests fixed precision in the query parameters of the query message, the server 120 may select the bitmap for the search of the index.

Spacetime Hashes

Figure 2:
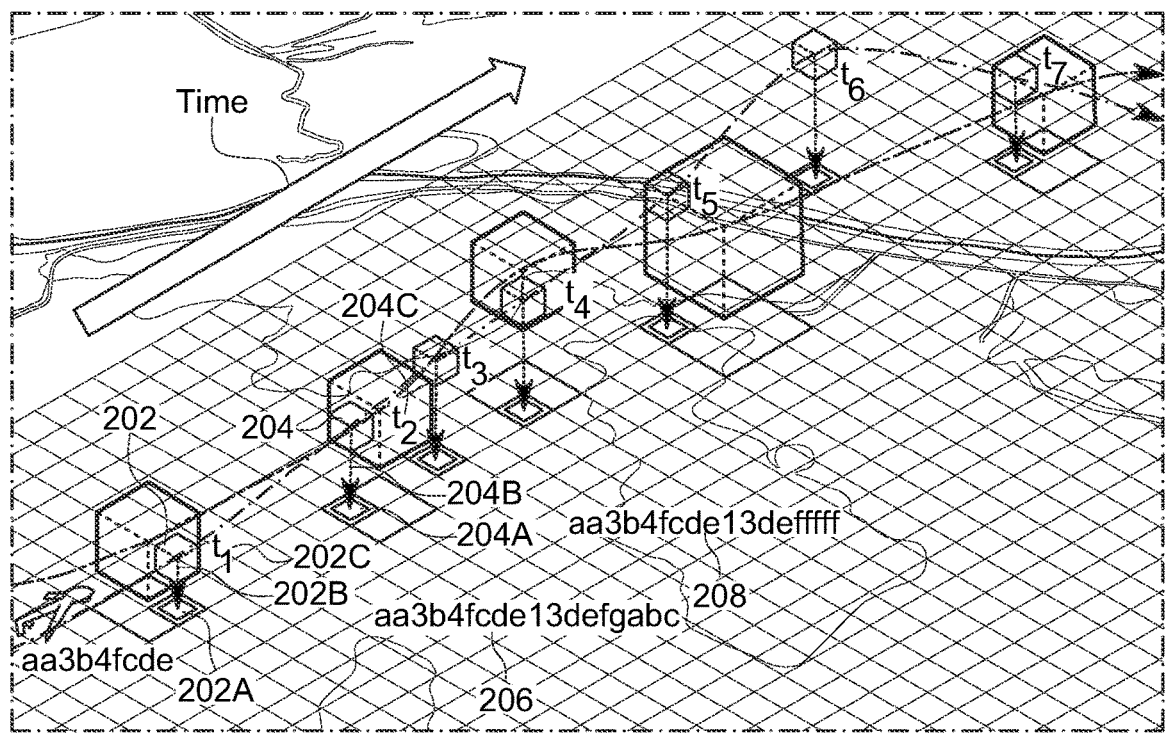
FIG. 2 depicts a diagram schematically showing spacetime hashes.

FIG. 2 depicts a diagram 200 schematically showing spacetime hashes. The features of the diagram 200 schematically showing the spacetime hashes of FIG. 2 may apply to FIGS. 1, 3, 4, 5A, 5B, and 6. The diagram 200 depicts, as an example, a plurality of observations for an entity over time, and how spacetime hashes are determined for the plurality of observations. The plurality of observations may include many observations (e.g., tens, hundreds, thousands, or millions over many different ranges of time), but for ease of reference a first observation 202 and a second observation 204 are labeled in FIG. 2. The server 120 may determine a first spacetime hash 206 for the first observation 202 and a second spacetime hash 208 for the second observation 204.

The first observation 202 and the second observation 204 may include at least first geospatial data 202A and second geospatial data 204A, first altitude data 202B and second altitude data 204B, and first time data 202C and second time data 204C. The geospatial data may indicate a latitude and longitude. The altitude data may indicate a distance above (or below) mean sea level. The geospatial data and/or the altitude data may be generated using an observation device that uses one or more of GPS/GNSS processes, signal triangulation processes, localization processes, scanner (e.g., sonar, radar, lidar, and the like) tracking processes, and the like. The time data may indicate a time and date in a standard format. The source 110 (such as first source 110A) may obtain the observations 202 and 204 from the observation device (or from a datastore associated with the observation device), and the source 110 may provide the observations 202 and 204 to the server 120 as records. The server 120 may, as discussed herein, process and manage the records in the datastore(s) 125.

In some cases, the observations 202 and 204 (or the records, as the source 110 may add additional information) may include additional data, such as one or combinations of: metadata of an entity, source, source precision, observation type, and/or observation precision. Metadata of the entity may include entity ID, entity type, organization of the entity, and the like. The source may indicate a system (such as the first source 110A, by a source ID for the first source 110A) that provided the geospatial data, altitude data, and time data to the server 120. The source precision may indicate level of precision generally associated with the source (e.g., if fixed or average). The observation type may indicate a type of observation device that generated the geospatial data, altitude data, and time data. The observation precision may indicate a level of precision generally associated with the observation type, a level of precision for the geospatial data, altitude data, and time data, and/or a level of confidence for the precision (e.g., due to GPS signal, radar reading, cell phone signal, and the like).

In some cases, the spacetime hash may be based on the geospatial data, altitude data, and time data. For instance, the spacetime hash may be based on a geohash, a time hash, and an altitude hash.

A geohash is an encoding of a location into an alpha-numeric hash. In some cases, a geohash is a two-dimensional gridding technique that encodes a precise location (e.g., in latitude and longitude) on the Earth as a two-dimensional grid cell using a variable length string (e.g., alphanumeric text, such ASCII). The string may correspond to a grid cell with a user-defined desired level of precision or allowed error. The length of the string may determine the precision of the grid/maximum error and corresponding cell size. In some cases, the two-dimensional grid is hierarchical. A hierarchical geohash may obtain smaller (more precise) or larger (less precise) grid cells that are children or parents of a current cell, respectively, by adding or removing characters from a string of the current cell. In some cases, a grid cell may contain a defined number (e.g., 32) of smaller and more precise child grid cells. For instance, the precision may range from 5000 kilometers at a string length one to 19 meters at string length 8, to sub-centimeters at longer string lengths. In some cases, the hierarchical geohash may be useful for counting/tracking observations and measuring observations at city, neighborhood, facility, and sub-facility levels.

A time hash is an encoding of a time and date into an alpha-numeric hash. In some cases, the time hash is a temporal binning technique for encoding a precise time as a fuzzy time interval using a variable length string. Like the geohash, the time hash may be a hierarchical time hash, such the length of the string determines precision. For instance, the hierarchical time hash may obtain smaller (more precise) or larger (less precise) time intervals that are children or parents of a current time interval, respectively, by adding or removing characters from a string of the current time interval. In some cases, each time interval of a time hash may contain a predetermined number (e.g., eight) child time intervals with smaller and more precise time intervals. For instance, the time intervals may range from sixteen year intervals down to fractions of a second.

An altitude hash is an encoding of altitude into an alpha-numeric hash. In some cases, the altitude hash is a range binning technique for encoding a precise altitude as a fuzzy altitude interval using a variable length string. Like the geohash, the altitude hash may be a hierarchical altitude hash, such the length of the string determines precision. For instance, the hierarchical altitude hash may obtain smaller (more precise) or larger (less precise) altitude intervals that are children or parents of a current altitude interval, respectively, by adding or removing characters from a string of the current altitude interval. In some cases, each altitude interval of an altitude hash may contain a predetermined number (e.g., 4) child altitude intervals with smaller and more precise altitude intervals. For instance, the altitude intervals may range from a kilometer (or kilometers) interval down to sub-centimeters interval.

In some cases, the spacetime hash may include the geohash, the time hash, and the altitude hash concatenated in sequence. In some cases, the geohash is first in the sequence, the time hash is second in the sequence, and the altitude hash is third in the sequence. Generally, the geohash, the time hash, and the altitude hash may be concatenated in a defined sequence (e.g., any of the six permutations of arranging the three hashes)

In some cases, the spacetime hash may include the geohash, the time hash, and the altitude hash interleaved in a defined sequence. For instance, the defined sequence may include a first set of space bits for a first subset of the geohash, a first set of time bits for a first subset of the time hash, and a first set of altitude bits for a first subset of the altitude hash in sequence before a second set of space bits, a second set of time bits, or a second set of altitude bits. Generally, the geohash, the time hash, and the altitude hash may be interleaved such that subsets of a first hash (e.g., the geohash) are spaced apart from other subsets of the first hash by at least one subset of a second hash (e.g., the time hash).

In some cases, the server 120 may use a four-dimensional spacetime hash (e.g., is a string that combines a geohash, altitude hash, and time hash), to produce a string value representing an entity's position in fuzzy three-dimensional space over time. In some cases, interleaving the geohash, the altitude hash, and the time hash characters may enable the spacetime hash to behave hierarchically, where adding and removing characters adjusts the precision of the space/time resolution. Thus, the use of spacetime hashes may enable rapidly exposing "same place and time" relationships between observations (e.g., data points) of varying precision. A benefit of the spacetime hashes (e.g., versus more traditional clustering algorithms and spatial data search algorithms) is the speed of searching strings (or bits). For instance, the server 120 may search a search data structure of the index 130 to rapidly determine if a matching string (or bit) exists in the search data structure.

In some cases, spacetime hashes have a property that makes them useful for variable precision geospatial analysis. For instance, for a given region and time window represented by a spacetime hash, all geohashes, altitude hashes, and time hashes contained within that region and time window begin with the same leading string (e.g., the spacetime hash's geohash, altitude hash, and time hash).

In some cases, using spacetime hashes also simplifies handling latency and stale data. The server 120 may (e.g., automatically, or as a search parameter of a query message) define a time hash interval beyond which observations (e.g., of records) should not be considered for correlation (e.g., the observations are too stale). For example, defining a time hash window with a precision of 10 may limit a lookback period to certain amount of time (e.g., 4 seconds), whereas a precision of 9 would increase the time window to a larger amount of time (e.g., 30 seconds).

In some cases, using spacetime hashes enables the server 120 to store the observations once and adjust an analytic region resolution and/or temporal resolution at query, based on availability of observations at a given region/time window.

Trie and Bitmap Search Data Structures

Figure 3:
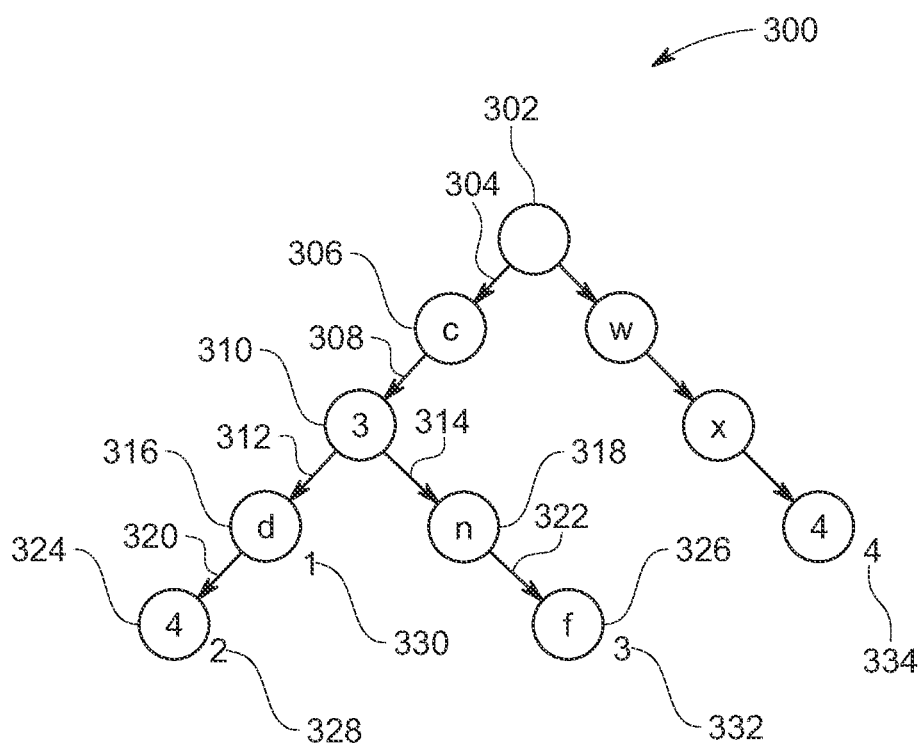
FIG. 3 depicts a first type of a search data structure for an index.

FIG. 3 depicts a first type of a search data structure 300 for an index. The features of the first type of search data structure 300 for the index of FIG. 3 may apply to FIGS. 1, 2, 5A, 5B, and 6. In some cases, the first type of the search data structure 300 may be a trie data structure. In some cases, the trie data structure may be a MARISA-Trie, Patricia Trie, directed acyclic word graph (DAWG), and/or Static Double Array Trie. In general, the trie data structure may be a static trie (e.g., the trie needs to be rebuilt every time a new data point is added) or a dynamic trie (e.g., can be updated with new data without being re-built). Static tries tend to be much more memory efficient at the cost of slower updates of new data. The trie data structure may be configured to group key values/spacetime hashes in nodes of the trie data structure. The arrangement (e.g., sequence of nodes and links between nodes) of the trie data structure may be defined based on the spacetime hashes of observations. For instance, each string of a spacetime hash may correspond to a sequence of nodes connected by links, where the sequence nodes correspond to individual characters of the string (e.g., in ASCII) and the links point to children nodes, and so on, and the last character of string corresponds to a node where a key value is stored for that spacetime hash. Thus, the trie data structure groups subsets of spacetime hashes within nodes of branches of the tree structure based on the value of the spacetime hashes.

As a non-limiting exemplary demonstration, FIG. 3 depicts a trie data structure 300 that has a root node 302 and a first set of child nodes (in this case, with links between the root node and nodes associated with characters "c" and "w"), a plurality of grand-children nodes (child nodes of the first set of child nodes) with links between child nodes and grand-children, and the like. The plurality of child nodes may correspond to first indexed characters (that is first character of a string) of all spacetime hashes to be searched for this trie data structure. For ease of reference, the disclosure will describe one branch of nodes below the root node 302 corresponding to a first link 304 to a first node 306 of the first set of child nodes. The first node 306 may have another link 308 that connects the first node 306 and a second node 310. The second node 310 may have a second set of child nodes (e.g., in this case, two nodes). The second set of child nodes may include a third node 316 (with a link 312 connecting the second node 310 and the third node 316) and a fourth node 318 (with a link 314 connecting the second node 310 and the fourth node 318). In some cases, some nodes (such as node 326 with link 322 to fourth node 318) may store key values, such as 328, 330, 332, 334 (e.g., the third node 316, and the like), while some nodes may be empty (e.g., the second node 310). In some cases, only terminus nodes (e.g., nodes with no children) may store key values, as all spacetime hashes may have a same number of characters in their strings. In some cases, any node (except a root node 302) may store key values, as the number of characters in the spacetime hashes may vary. See, for example, a third node 316 that stores key values but also has children nodes.

The server 120 may update the trie data structure by adding nodes (and links to parent/children notes), or add key values to nodes. The server 120 may add nodes as new observations/records are added to the data datastore(s) 125, if the new observations/records do not map to an existing sequence of nodes. In the case that the new observations/records do map to an existing sequence of nodes, the server 120 may update the stored key values in the last node of the sequence of nodes to include the new key values.

In some cases, the server 120 may generate/maintain multiple different versions of the trie data structure. For instance, a first version may be a global version (e.g., to include all observations/records), a second version may be focused on a certain time window, a third version may be focused on observations/records for a specific region, and the like. In this manner, the server 120 may perform searches using specialized trie data structures on more limited datasets, to reduce computation resource and/or time. For instance, the search parameters may indicate the search should only cover North America, so the server 120 may select a North America trie data structure.

In some cases, the server 120 may remove nodes or key values from nodes. For instance, as data becomes stale (e.g., for a trie that is designed to find observations/records for a time window, such as the last day, week, or year), the server 120 may remove nodes if those nodes store key values that correspond to time data outside the window. Additionally, the server 120 may remove key values from nodes if the key values correspond to time data outside the window. In some cases, the server 120 may not remove nodes if at least one key value/spacetime hash maps to the node (e.g., unless the time window has changed).

To search the trie data structure, the server 120 may traverse the trie data structure in accordance with the spacetime hash of entity of interest. For instance, the server 120 may, starting at the root node 302, recursively determine a link to a child node that matches a successively indexed character from a string of the spacetime hash, and determine a matching node in response to indexing a last character of the string. As an example for the string "c3d," the server 120 may index the first character of the spacetime hash ("c"), then index the second character ("3"), then index the third character ("d"), then determine the third node 316 is a matching node and its key values 330 are matching key values. The server 120 may then retrieve a key value for the matching node.

In some cases, the server 120 may determine any deeper nodes below the matching node; and retrieve key values from the matching node and, if any, deeper nodes. As an example for the string "c3d," the server 120 may index the first character of the spacetime hash ("c"), then index the second character ("3"), then index the third character ("d"), then determine the third node 316 is a matching node and its key values 330 and key values 328 of deeper nodes 324 are matching key values. In this manner, trie data structure and the hierarchical structure of spacetime hashes may enable rapid determinations of any observations/records that are within a fuzzy 4-d region-time domain.

Figure 4:
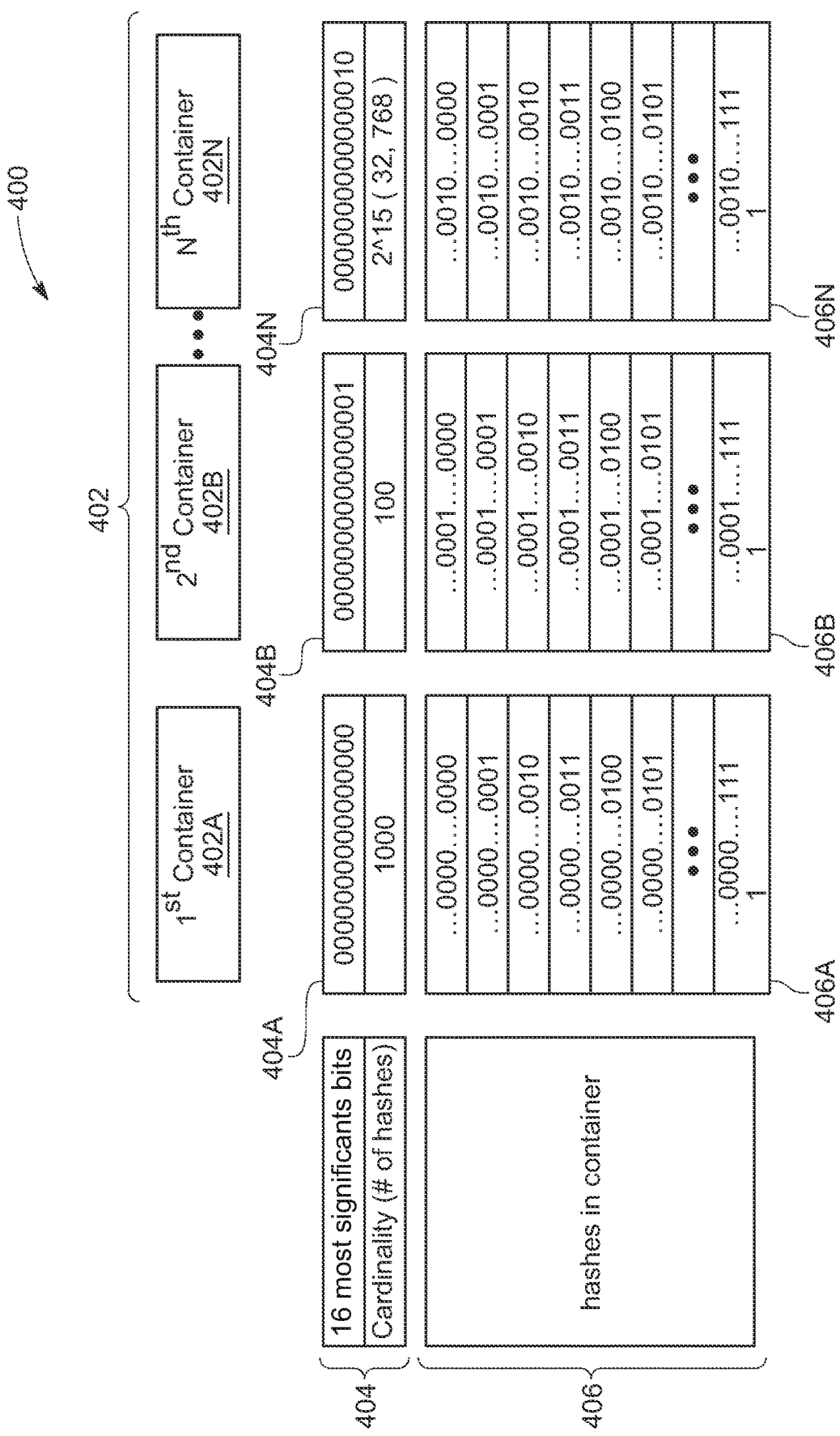
FIG. 4 depicts a second type of a search data structure for an index.

FIG. 4 depicts a second type of a search data structure 400 for an index. The features of the second type of search data structure 400 for the index of FIG. 4 may apply to FIGS. 1, 2, 5A, 5B, and 6. In some cases, the second type of search data structure 400 may be a bitmap data structure. In some cases, the bitmap data structure may be a roaring bitmap or a roaring plus run bitmap. In some cases, the bitmap data structure includes encoded spacetime hashes with binary length 32 bit or 64 bit. In some cases, the bitmap data structure includes encoded spacetime hashes with a set binary bit length, such as binary length 32 bit, 64 bit, 128 bit, and the like.

In the case of bitmap data structure being a bitmap, the bitmap may be a group of bit vectors corresponding to spacetime hashes. In the case of bitmap data structure being a roaring bitmap, the roaring bitmap may group bit vectors into separate groups (e.g., based on most significant bits). Generally, the server 120 may obtain the spatial-time data (e.g., latitude/longitude/altitude/time), encode the spatial-time data into a spacetime hash (e.g., an ASCII string), encode the spacetime hash into a hexadecimal string, and encode the hexadecimal string into a bit integer. The server 120 may then store the bit integer (corresponding to a spacetime hash, if decoded back) into the bitmap/roaring bitmap.

Like with the trie data structure, the server 120 may generate/maintain multiple different versions of bitmaps/roaring bitmaps. For instance, a first version may be a global version (e.g., to include all observations/records), a second version may be focused on a certain time window, a third version may be focused on observations/records for a specific region, and the like. In this manner, the server 120 may perform searches using specialized bitmap data structures on more limited datasets, to reduce computation resource and/or time. For instance, the search parameters may indicate the search should only cover North America, so the server 120 may select a North America bitmap data structure.

Generally, roaring bitmaps are a compressed bitmap data structure (e.g., optimized for 64-bit CPUs) that enable set operations on 32 or 64 bit integers, with performance improvements of up to three orders of magnitude. As a non-limiting example, the bitmap data structure 400 includes a plurality of containers 402, including a first container 402A, a second container 402B, . . . , and an Nth container 402N. Each container may store spacetime hashes 406 in (a compressed or not) a binary notation, as first spacetime bit integers 406A, second spacetime bit integers 406B . . . and Nth spacetime bit integers 406N. Each container of container 402 may also have metadata 404 (e.g., in a table or other data structure) associated with it, such as first container metadata 404A, second container metadata 404B, . . . and Nth container metadata 404N. The metadata 404 may indicate a partition associated with a container and a cardinality of the container. The partition associated with a container may be a set of most significant bits that are shared with all spacetime hashes stored in the container. The cardinality of the container may indicate a number of spacetime hashes stored in the container. The bitmap data structure may store the spacetime hashes (e.g., in binary format) in different manners based on whether the number of spacetime hashes is considered sparse or dense (e.g., based on a threshold number). A sparse number of spacetime hashes may be stored in a list/array format), while a dense number of spacetime hashes may be stored in a bitmap format. In the case depicted in FIG. 4, the first and second containers 402A and 402B may store the spacetime hashes in a list/array format, while the Nth container 402N may store the spacetime hashes in a bitmap.

To generate the bitmap data structure, the server 120 may obtain a plurality of spacetime hashes, encode the spacetime hashes into bit integers, determine shared most significant bits for sets of the bit integers, assign bit integers to different containers based on their respective most significant bits, and store the bit integer in the assigned containers. In some cases, the server 120 may also determine whether a container is sparse or dense, and store the bit integers based on whether the container is sparse or dense.

To update the bitmap data structure, the server 120 may add new bit integers for inbound observations/records to the bitmap data structure. For instance, the server 120 may determine bit integers for the inbound observations/records, and determine a container for the bit integer based on their respective most significant bits. In some cases, the server 120 may remove bit integers from the bitmap data structure (e.g., if the data is stale). In some cases, the server 120 may automatically (e.g., in response to the update or at set intervals) determine if the container has switched from being sparse to dense (or dense to sparse) and, if so, change a manner in which the bit integers are stored in the container.

To search the bitmap, the server 120 may encode a spacetime hash of the entity of interest into binary notation, and determine whether the encoded spacetime hash of the entity of interest is included in the bitmap. For instance, the server 120 may determine whether the encoded spacetime hash of the entity of interest is a subset of the bitmap.

In response to determining the encoded spacetime hash (e.g., a bit integer) is a subset of the bitmap, the server 120 may determine a key value for the matching encoded spacetime hash in the bitmap that matches the encoded spacetime hash of the entity of interest. For instance, the bitmap search returns a Boolean value of true if the bit integer is a subset of the bitmap, or a Boolean value of false if the bit integer is not a subset of the bitmap. If the Boolean value is true, the server 120 may then search the datastore(s) 125 for a spacetime hash corresponding to the bit integer. In this manner, a search of the bitmap (that returns true Boolean value) may indicate the search of the datastore(s) 125 will find a match and is faster than just running the search of the datastore(s) for a match (without knowing a match will be found).

In some cases, the bitmap data structure may provide fixed precision searches. To provide fixed precision searches with complete results, the bitmap data structure may have the following conditions: (1) the precision of the spacetime hashes (e.g., their string length) within the bitmap all match each other, and (2) the precision of the spacetime hash (e.g., its string length) used to query the bitmap must match the precision of the spacetime hashes stored in the bitmap. To provide fixed precision searches with partial results, the bitmap data structure may have the following conditions: (1) the precision of the spacetime hashes (e.g., their string length) within the bitmap do not all match each other, and (2) the precision of the spacetime hash (e.g., its string length) used to query the bitmap must match the precision of at least a subset the spacetime hashes stored in the bitmap.

Thus, the server 120 may automatically select (even if a search parameter is included or not) a trie or a bitmap based on the precision level of the query and the precision level of the spacetime hashes stored in the bitmap. If the precision level (e.g., the string length) does not match, the server 120 may select the trie. Optionally, the server 120 may also search the bitmap for a partial result if at least a subset of the spacetime hashes match the prevision level of the query.

In some cases, roaring bitmaps may implement a number of operations to search the bitmaps. The operations may include one or combinations of: a subset operation, an intersection operation, and a Jaccard Distance operation.

A subset operation may determine whether a set of spacetime hashes (e.g., one or a plurality of spacetime hashes of a query or inbound records) exist in the roaring bitmap. The subset operation returns a Boolean value of true or false. An intersection operation may return a set of (encoded) spacetime hashes that match between the search query (e.g., for an entity of interest or inbound records) and the roaring bitmap.

A Jaccard distance operation may determine a similarity metric of two sets of (encoded) spacetime hashes in the roaring bitmap. For instance, if two devices (e.g., with different device IDs) have spacetime hashes stored as bit integers in the roaring bitmap, the server 120 may execute the Jaccard distance operation and obtain a similarity metric between two devices (based on the observations encoded in the roaring bitmap) and quantify the relationship between these entities. For instance, to quantify the relationship, the server 120 may determine the two devices are the same or co-travelers if the two sets have a similarity metric above a threshold value, or determine the two devices are not the same or co-travelers if the similarity metric is below a threshold value.

Generate/Update an Index

FIG. 5A depicts a block diagram 500A schematically showing operations O502 through O514 to generate/update an index. The features of the block diagram 500A schematically showing operations O502 through O514 to generate/update the index of FIG. 5A may apply to FIGS. 1, 2, 3, 4, 5A, and 6. The operations O502 through O514 may be performed by various devices of the environment 100.

In operation O502, the sources 110 may transmit inbound records to the server 120. For instance, the sources 110 may transmit inbound records in real-time or in batches (e.g., at set intervals, or in response to trigger conditions, such as data being gathered from observation devices). The server 120 may receive the inbound records from the sources 110.

In operation O504, the index 130 may transmit a current search data structure. The index 130 may transmit the current search data structure in response to a request from the server 120, in response to inbound records, or in response to receiving an updated search data structure (e.g., server 120 is a cloud system with multiple instances of the query application).

In operation O506, the server 120 may process the inbound records, correlate the inbound records with existing records based on current search data structure, and determine new or fused records. To process the inbound records, the server 120 may apply extract, transform, and load processes to the inbound records. The extract, transform, and load processes may include: extracting key fields, generating spacetime hashes, applying Kalman filtering, and the like. To correlate inbound records with existing records, the server 120 may perform a multi-tiered search process that includes at least first searching the current search data structure for any existing records that overlap in 4-d spacetime, as discussed herein. The multi-tiered search process may then analyze device IDs and/or metadata to confirm co-traveler or duplicate observations, and the like, if a matching key value term is found in the search of the search data structure. Based on the output of the multi-tiered search process, the server 120 may determine new or fused records.

In operation O508, the server 120 may update the datastore(s) 125 with the new or fused records. In operation O510, the server 120 may update the search data structure or generate a new search data structure, as discussed herein. In operation O512 and O514, the server 120 may pull records (e.g., as needed) from the datastore 125 and update the index 130 with the updated/newly generated search data structure, as discussed herein.

Search an Index

Figure 5B:
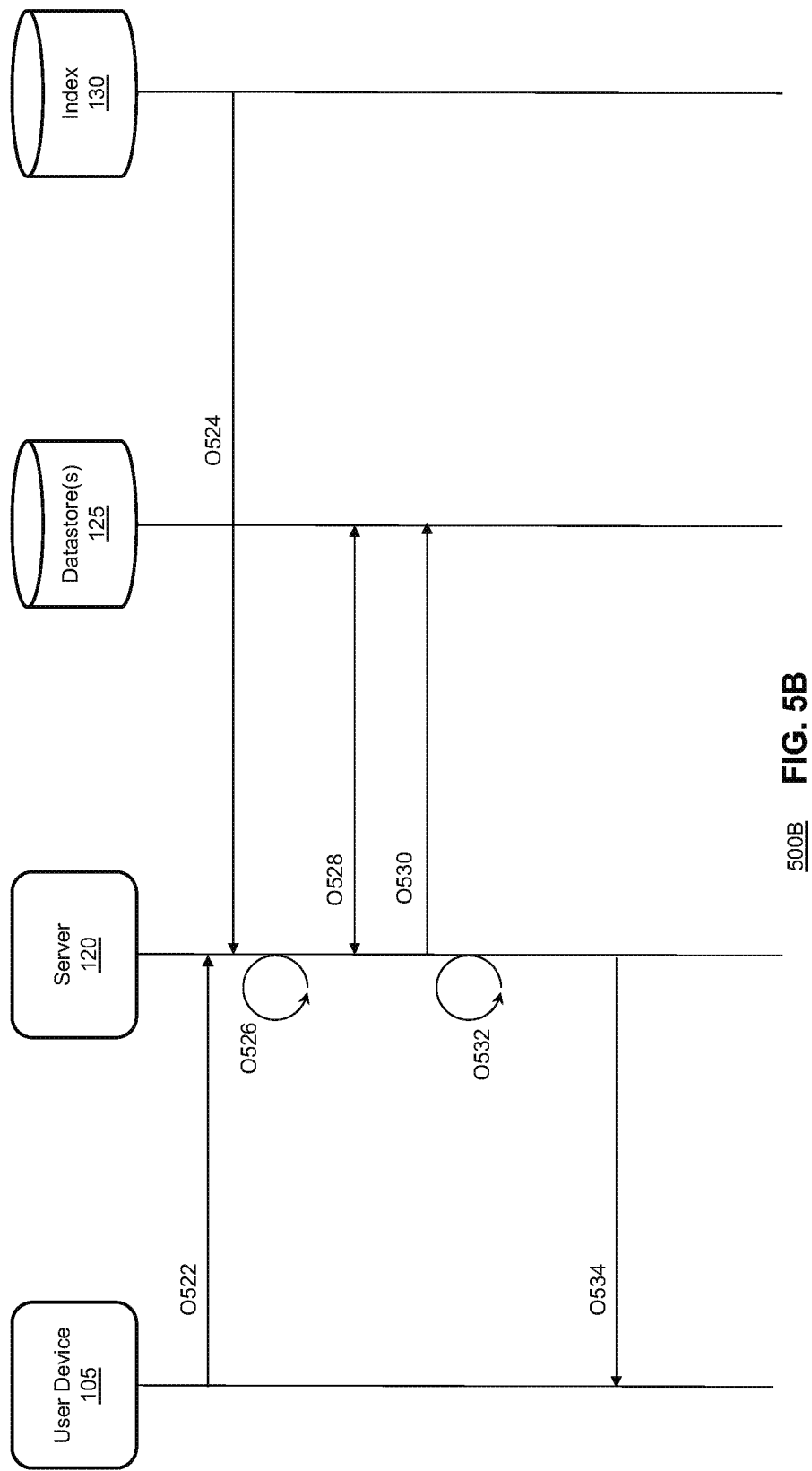
FIG. 5B depicts a block diagram schematically showing operations to search an index.

FIG. 5B depicts a block diagram 500B schematically showing operations O522 through O534 to search an index. The features of the block diagram 500B schematically showing operations O522 through O534 to search the index of FIG. 5B may apply to FIGS. 1, 2, 3, 4, 5A, and 6. The operations O522 through O534 may be performed by various devices of the environment 100.

In operation O522, the user device 105 may transmit a query message to the server 120. For instance, the user device 105 may generate the query message based on user inputs (via a graphical user interface) and/or generate the query message algorithmically (based on operations software triggers, e.g., in response to sensing an entity) to (1) request a status of an entity or (2) request tracking of an entity.

In operation O524, the index 130 may transmit a current search data structure. The index 130 may transmit the current search data structure in response to a request from the server 120, in response to the query message, or in response to receiving an updated search data structure (e.g., server 120 is a cloud system with multiple instances of the query application).

In operation O526, the server 120 may process the query message (e.g., extract search parameters and the like), and search the current search data structure for, if any, matching key values, as discussed herein.

In some cases, the server 120 may also (1) search, using inbound device IDs, for matching device IDs in an ID datastore to correlate inbound observations/records to existing observation/records and/or (2) search, using inbound metadata sets, for matching metadata sets in a metadata datastore to correlate inbound observations/records to existing observations/records. In these cases, the additional searches may be performed in parallel or after the search of the current search data structure. In some cases (e.g., geospatial and time data is not a part of an inbound observation/record), the server 120 may by-pass the search of the current search data structure (e.g., because the server 120 cannot determine a spacetime hash for the inbound record) but still correlate inbound observations/records. In some cases, the additional searches may supplement the search of the current search data structure. In these cases, device ID search/metadata search may operate to increase a confidence score for deduplication or co-traveler determination.

In operation O528, the server 120 may retrieve relevant data based on the at least one matching key. For instance, the relevant data may be metrics, metadata, and/or observation data of records corresponding to the matching key values.

In operation O530, the server 120 may update records of datastore(s) 125. For instance, the server 120 may update records of the datastore(s) 125 if the query message included additional contextual data regarding observations, device IDs, etc.

In operation O532, the server 120 may generate a query response. For instance, the server 120 may package the relevant data obtained in operation O528 in a defined format. In operation O534, the server 120 may transmit the query response to the user device 105.

Computer System

Figure 6:
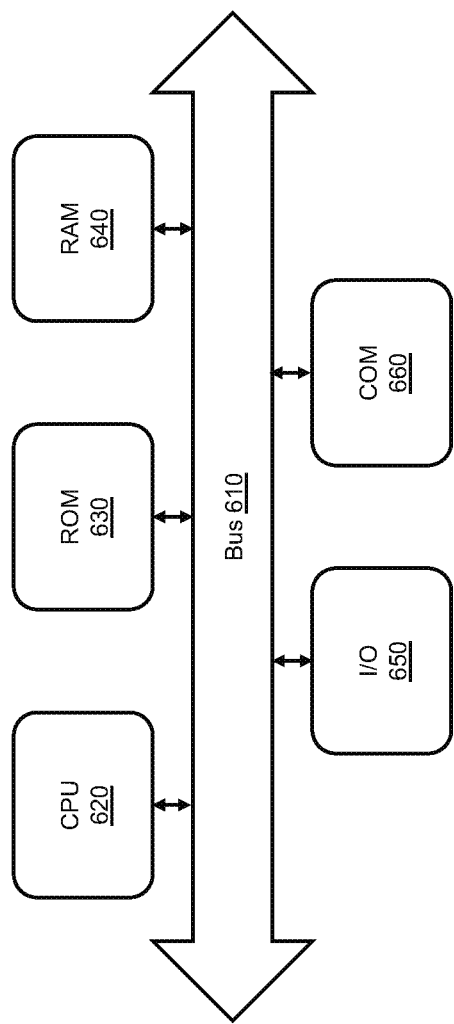
FIG. 6 depicts an example system that may execute techniques presented herein.

FIG. 6 depicts an example system that may execute techniques presented herein. FIG. 6 is a simplified functional block diagram of a computer that may be configured to execute techniques described herein, according to exemplary cases of the present disclosure. Specifically, the computer (or "platform" as it may not be a single physical computer infrastructure) may include a data communication interface 660 for packet data communication. The platform may also include a central processing unit 620, in the form of one or more processors, for executing program instructions. The platform may include an internal communication bus 610, and the platform may also include a program storage and/or a data storage for various data files to be processed and/or communicated by the platform such as ROM 630 and RAM 640, although the system 600 may receive programming and data via network communications. The system 600 also may include input and output ports 650 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In some cases, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Terminology

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

EXAMPLES

Exemplary embodiments of the systems and methods disclosed herein are described in the numbered paragraphs below.

A1. A system for geospatial correlation, the system comprising:
  at least one processor; and
  at least one memory storing instruction that, when executed by the at least one processor, cause the at least one processor to perform operations, the operations including:
    obtaining a plurality of records from at least one database, wherein each record of the plurality of records has a key value that points to the record in a database, and each of the plurality of records includes at least data for an observation of an entity;
    generating an index based on the plurality of records, wherein generating the index includes:
      determining a plurality of observations based on the plurality of records, an observation including a device identifier and time-and-geolocation data for a record of the plurality of records;
      encoding the plurality of observations into a plurality of spacetime hashes;
      forming a search data structure of the index for a plurality of key values based on the plurality of spacetime hashes, wherein the search data structure groups subsets of the plurality of spacetime hashes;
    after the index is generated:
      receiving a query message from a user device regarding an entity of interest;
      executing a search of the index based on the query message; and
      in response to the search of the index returning at least one matching key value, transmitting, to the user device, a query response based on the at least one matching key value.

A2. The system of A1, wherein the query response includes the at least one matching key value and/or data retrieved from the at least one database based on the at least one matching key value.

A3. The system of A2, wherein the query response indicates a correlation between the entity of interest and entity(s) associated with the at least one matching key value.

A4. The system of A3, wherein, to determine the correlation, the operations further include: determine an identifier of the entity of interest matches an identifier associated with the at least one matching key value.

A5. The system of A3, wherein, to determine the correlation, the operations further include: determine metadata of the entity of interest correlates to metadata associated with the at least one matching key value.

A6. The system of A3, wherein the operations further include: fuse observation data of the at least one matching key value and observation data associated with the entity of interest.

A7. The system of any of A1-A6, wherein the spacetime hash is based on a geohash, a time hash, and an altitude hash.

A8. The system of A7, wherein the spacetime hash includes the geohash, the time hash, and the altitude hash concatenated in sequence.

A9. The system of A7, wherein the spacetime hash includes the geohash, the time hash, and the altitude hash interleaved in a defined sequence.

A10. The system of A9, wherein the defined sequence includes a first set of space bits for a first subset of the geohash, a first set of time bits for a first subset of the time hash, and a first set of altitude bits for a first subset of the altitude hash in sequence before a second set of space bits, a second set of time bits, or a second set of altitude bits.

A11. The system of any of A1-A10, wherein the search data structure is a trie or a bitmap.

A12. The system of A11, wherein, when the query message requests variable precision in query parameters of the query message, the operations further include: select the trie for the search of the index.

A13. The system of A11, wherein, when the query message requests fixed precision in query parameters of the query message, the operations further include: select the bitmap for the search of the index.

A14. The system of A11, wherein the bitmap is a roaring bitmap or a roaring plus run bitmap.

A15. The system of A11, wherein the bitmap includes encoded spacetime hashes with binary length 32 bit or 64 bit.

A16. The system of A11, wherein, to search the bitmap, the operations include:
  encode a spacetime hash of the entity of interest into binary notation;
  determine the encoded spacetime hash of the entity of interest is included in the bitmap by determining the encoded spacetime hash of the entity of interest is a subset of the bitmap; and
  determine a key value for the matching encoded spacetime hash in the bitmap that matches the encoded spacetime hash of the entity of interest.

A17. The system of A11, wherein, to search the trie, the operations include: traverse the trie in accordance with the spacetime hash of entity of interest.

A18. The system of A11, wherein, to traverse the trie, starting at a root node, the operations include:
  recursively determine a link to a child node that matches a successively indexed character from a string of the spacetime hash;
  determine a matching node in response to indexing a last character of the string;
  determine any deeper nodes; and
  retrieve key values from the matching node and, if any, deeper nodes.

A19. A system for geospatial correlation, the system comprising:
  at least one processor; and
  at least one memory storing instruction that, when executed by the at least one processor, cause the at least one processor to perform operations, the operations including:
    receive a query message from a user device, the query message including a query in a defined format;

parse the query and extract search parameters and at least one of a device ID or time-and-geolocation data of an entity of interest;

obtain an encoded spacetime hash for a search based on the device ID or the time-and-geolocation data of the entity of interest;

retrieve an index, wherein the index includes a search data structure for a plurality of key values, each of the plurality of key values point to at least one record of a plurality of records stored in at least one database, each of the plurality of records includes at least data for an observation of an entity, the search data structure is based on a plurality of spacetime hashes generated based on observations of entities, and the search data structure groups subsets of the plurality of spacetime hashes;

execute a search of the index in accordance with the search parameters of the query and the spacetime hash; and in response to the search of the index returning at least one matching key value, transmit, to the user device, a query response based on the at least one matching key value.

A20. A computer-implemented method for geospatial correlation, the computer-implemented comprising:

obtaining a plurality of records from at least one database, wherein each record of the plurality of records has a key value that points to the record in a database, and each of the plurality of records includes at least data for an observation of an entity;

generating an index based on the plurality of records, wherein generating the index includes:

determining a plurality of observations based on the plurality of records, an observation including a device identifier and time-and-geolocation data for a record of the plurality of records;

encoding the plurality of observations into a plurality of spacetime hashes;

forming a search data structure of the index for a plurality of key values based on the plurality of spacetime hashes, wherein the search data structure groups subsets of the plurality of spacetime hashes;

after the index is generated:

receiving a query message from a user device regarding an entity of interest;

executing a search of the index based on the query message; and in response to the search of the index returning at least one matching key value, transmitting, to the user device, a query response based on the at least one matching key value.

Other aspects of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for geospatial correlation, the system comprising:

at least one processor; and at least one memory storing instruction that, when executed by the at least one processor, cause the at least one processor to perform operations, the operations including:

obtaining a plurality of records from at least one database, wherein each record of the plurality of records has a key value that points to a record in a database, and each of the plurality of records includes at least data for an observation;

generating an index based on the plurality of records, wherein generating the index includes:

determining a plurality of observations based on the plurality of records, an observation including time-and-geolocation data for a record of the plurality of records;

encoding the plurality of observations into a plurality of spacetime hashes;

forming a search data structure of the index for a plurality of key values based on the plurality of spacetime hashes, wherein the search data structure is configured to group subsets of the plurality of spacetime hashes;

after the index is generated:

receiving a query message from a user device;

executing a search of the index based on the query message; and in response to the search of the index returning at least one matching key value, transmitting, to the user device, a query response based on the at least one matching key value.

2. The system of claim 1, wherein the query response includes the at least one matching key value and/or data retrieved from the at least one database based on the at least one matching key value.

3. The system of claim 2, wherein the query response indicates a correlation between related observations based on the at least one matching key value.

4. The system of claim 3, wherein, to determine the correlation, the operations further include: determine an identifier associated with the observation matches an identifier associated with the at least one matching key value.

5. The system of claim 3, wherein, to determine the correlation, the operations further include: determine metadata associated with the observation correlates to metadata associated with the at least one matching key value.

6. The system of claim 3, wherein the operations further include: fuse observation data of the at least one matching key value and observation data associated with the observation.

7. The system of claim 1, wherein a spacetime hash of the plurality of spacetime hashes is based on a geohash, a time hash, and an altitude hash.

8. The system of claim 7, wherein the spacetime hash includes the geohash, the time hash, and the altitude hash concatenated in sequence.

9. The system of claim 7, wherein the spacetime hash includes the geohash, the time hash, and the altitude hash interleaved in a defined sequence.

10. The system of claim 9, wherein the defined sequence includes a first set of space bits for a first subset of the geohash, a first set of time bits for a first subset of the time hash, and a first set of altitude bits for a first subset of the altitude hash in sequence before a second set of space bits, a second set of time bits, or a second set of altitude bits.

11. The system of claim 1, wherein the search data structure is a trie or a bitmap.

12. The system of claim 11, wherein, when the query message requests variable precision in query parameters of the query message, the operations further include: select the trie for the search of the index.

13. The system of claim 11, wherein, when the query message requests fixed precision in query parameters of the query message, the operations further include: select the bitmap for the search of the index.

14. The system of claim 11, wherein the bitmap is a roaring bitmap or a roaring plus run bitmap.

15. The system of claim 11, wherein the bitmap includes encoded spacetime hashes with binary length 32 bit or 64 bit.

16. The system of claim 11, wherein, to search the bitmap, the operations include:
encode a spacetime hash into binary notation to obtain an encoded spacetime hash;
determine the encoded spacetime hash is included in the bitmap by determining the encoded spacetime hash is a subset of the bitmap, thereby determining a matching encoded spacetime hash; and
determine a key value for the matching encoded spacetime hash in the bitmap that matches the encoded spacetime hash.

17. The system of claim 11, wherein, to search the trie, the operations include: traverse the trie in accordance with a spacetime hash of the plurality of spacetime hashes.

18. The system of claim 11, wherein, to traverse the trie, starting at a root node, the operations include:
recursively determine a link to a child node that matches a successively indexed character from a string of a spacetime hash based on the query message;
determine a matching node in response to indexing a last character of the string;
determine any deeper nodes; and
retrieve key values from the matching node and, if any, deeper nodes.

19. A system for geospatial correlation, the system comprising:
at least one processor; and
at least one memory storing instruction that, when executed by the at least one processor, cause the at least one processor to perform operations, the operations including:
receive a query message from a user device, the query message including a query in a defined format;
parse the query and extract search parameters and time-and-geolocation data;
obtain an encoded spacetime hash for a search based on the time-and-geolocation data;
retrieve an index, wherein
the index includes a search data structure for a plurality of key values,
each of the plurality of key values are configured to point to at least one record of a plurality of records stored in at least one database,
each of the plurality of records includes at least data for an observation,
the search data structure is based on a plurality of spacetime hashes generated based on observations, and
the search data structure is configured to group subsets of the plurality of spacetime hashes;
execute a search of the index in accordance with the search parameters of the query and the encoded spacetime hash; and
in response to the search of the index returning at least one matching key value, transmit, to the user device, a query response based on the at least one matching key value.

20. A computer-implemented method for geospatial correlation, the computer-implemented method comprising:
obtaining a plurality of records from at least one database, wherein each record of the plurality of records has a key value that points to a record in a database, and each of the plurality of records includes at least data for an observation;
generating an index based on the plurality of records, wherein generating the index includes:
determining a plurality of observations based on the plurality of records, an observation including time-and-geolocation data for a record of the plurality of records;
encoding the plurality of observations into a plurality of spacetime hashes;
forming a search data structure of the index for a plurality of key values based on the plurality of spacetime hashes, wherein the search data structure is configured to group subsets of the plurality of spacetime hashes;
after the index is generated:
receiving a query message from a user device;
executing a search of the index based on the query message; and
in response to the search of the index returning at least one matching key value, transmitting, to the user device, a query response based on the at least one matching key value.

* * * * *